United States Patent
Gilderman et al.

(10) Patent No.: US 12,055,999 B2
(45) Date of Patent: Aug. 6, 2024

(54) APPLICATION RELIABILITY SERVICE

(71) Applicant: Amazon Technologies, Inc., Seattle, WA (US)

(72) Inventors: Ilia Gilderman, Bellevue, WA (US); Eran Schitzer, Sunnyvale, CA (US); Priyesh Ranjan Tiwari, Bellevue, WA (US); Oded Sharon, Ramat Gan (IL); Damodar Shetyo, Marcela (IN); Shruthi Ramakrishnan, Bothell, WA (US); Zachary Adam Bienenfeld, Kiryat Gat (IL); Ben Fedidat, Jerusalem (IL); Dmitrij Semionov, Reading, MA (US); Haim Sharabani, Modiin (IL); Zhifeng Wang, Billerica, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/244,404

(22) Filed: Apr. 29, 2021

(65) Prior Publication Data

US 2022/0171667 A1    Jun. 2, 2022

(30) Foreign Application Priority Data

Nov. 30, 2020  (IN)  .............................. 202021052182

(51) Int. Cl.
*G06F 11/00*  (2006.01)
*G06F 8/65*   (2018.01)
(Continued)

(52) U.S. Cl.
CPC .............. *G06F 11/079* (2013.01); *G06F 8/65* (2013.01); *G06F 11/076* (2013.01);
(Continued)

(58) Field of Classification Search
CPC ...... G06F 11/00; G06F 11/076; G06F 11/079; G06F 11/0793; G06F 11/2289;
(Continued)

(56) References Cited

U.S. PATENT DOCUMENTS 7,174,379 B2 *  2/2007  Agarwal ............... G06F 9/5055
                                                    717/165
10,970,135 B2 *  4/2021  Luck ........................ G06F 8/35
(Continued)

OTHER PUBLICATIONS

Lam, Dung, Erik Skiles, and Paul Grisham. "Simulation tool for evaluation and design of resilience strategies." In 2013 6th International Symposium on Resilient Control Systems (ISRCS), pp. 186-191. IEEE, 2013. (Year: 2013).*

*Primary Examiner* — Philip Guyton
(74) *Attorney, Agent, or Firm* — Davis Wright Tremaine LLP

(57) ABSTRACT

The reliability of an application is improved by analyzing and implementing changes to application infrastructure that is represented, in some examples, as Infrastructure as Code ("IAC"). The system performs various tests on the infrastructure to determine how the infrastructure responds to failures and whether recovery procedures and monitoring services in place are effective and functioning properly. Various examples provide a measure of infrastructure resiliency that can be used to evaluate potential changes to application infrastructure.

19 Claims, 9 Drawing Sheets

(51) Int. Cl.
*G06F 11/07* (2006.01)
*G06F 11/22* (2006.01)
*G06Q 10/0637* (2023.01)
*G06Q 10/0639* (2023.01)
*G06Q 30/018* (2023.01)

(52) U.S. Cl.
CPC ...... *G06F 11/0793* (2013.01); *G06F 11/2289* (2013.01); *G06Q 10/06375* (2013.01); *G06Q 10/06393* (2013.01); *G06F 11/00* (2013.01); *G06F 2212/1032* (2013.01); *G06Q 30/018* (2013.01)

(58) Field of Classification Search
CPC ...... G06F 11/22; G06F 11/2205; G06F 11/30; G06F 11/3003; G06F 11/3006; G06F 11/302; G06F 11/34; G06F 11/3404; G06F 11/3409; G06F 11/3428; G06F 11/3442; G06F 11/3447; G06F 11/3452; G06F 11/3466; G06F 11/3664; G06F 11/3672; G06F 11/3676; G06F 11/3692; G06F 8/65; G06F 8/60; G06F 8/658; G06F 2212/1032; G06Q 10/06375; G06Q 10/06393; G06Q 30/018
See application file for complete search history.

(56) References Cited

U.S. PATENT DOCUMENTS

| | | | |
|---|---|---|---|
| 11,194,628 B2* | 12/2021 | Reyes | G06F 11/3433 |
| 11,233,708 B1* | 1/2022 | Bawcom | G06Q 10/0633 |
| 2010/0131084 A1* | 5/2010 | Van Camp | G06F 8/65 700/86 |
| 2013/0262643 A1* | 10/2013 | Anderson | G06F 8/60 709/223 |
| 2016/0335579 A1* | 11/2016 | Anderson | G06Q 10/0637 |
| 2018/0114271 A1* | 4/2018 | Jhoney | G06F 11/0751 |
| 2020/0092334 A1* | 3/2020 | Hiebert | H04L 41/0816 |
| 2020/0159421 A1* | 5/2020 | Karumbunathan | G06F 3/061 |
| 2020/0175439 A1* | 6/2020 | Abu El Ata | G06Q 10/0635 |
| 2021/0160146 A1* | 5/2021 | Sisman | G06F 11/008 |

* cited by examiner

APPLICATION RELIABILITY SERVICE

CROSS-REFERENCE TO RELATED APPLICATION

This application claims the benefit of and priority to Indian Patent Application No. 202021052182, filed Nov. 30, 2020, entitled "APPLICATION RELIABILITY SERVICE," the disclosure of which is incorporated herein by reference in its entirety.

BACKGROUND

IT infrastructure is a critical part of many business operations, and failure of IT infrastructure can have dire effects on business operations. Many methods have been advanced to improve reliability of business applications. For example, hardware has been developed with redundant components so that the impact of a single hardware failure is masked. Applications have been made with regional redundancy and with the ability to restore themselves in the event of a crash. However, as applications have moved from being hosted by customer-owned hardware to cloud-hosted environments, managing the reliability and resilience of business applications has become more difficult.

BRIEF DESCRIPTION OF THE DRAWINGS

Various techniques will be described with reference to the drawings, in which.

DETAILED DESCRIPTION

Figure 1:
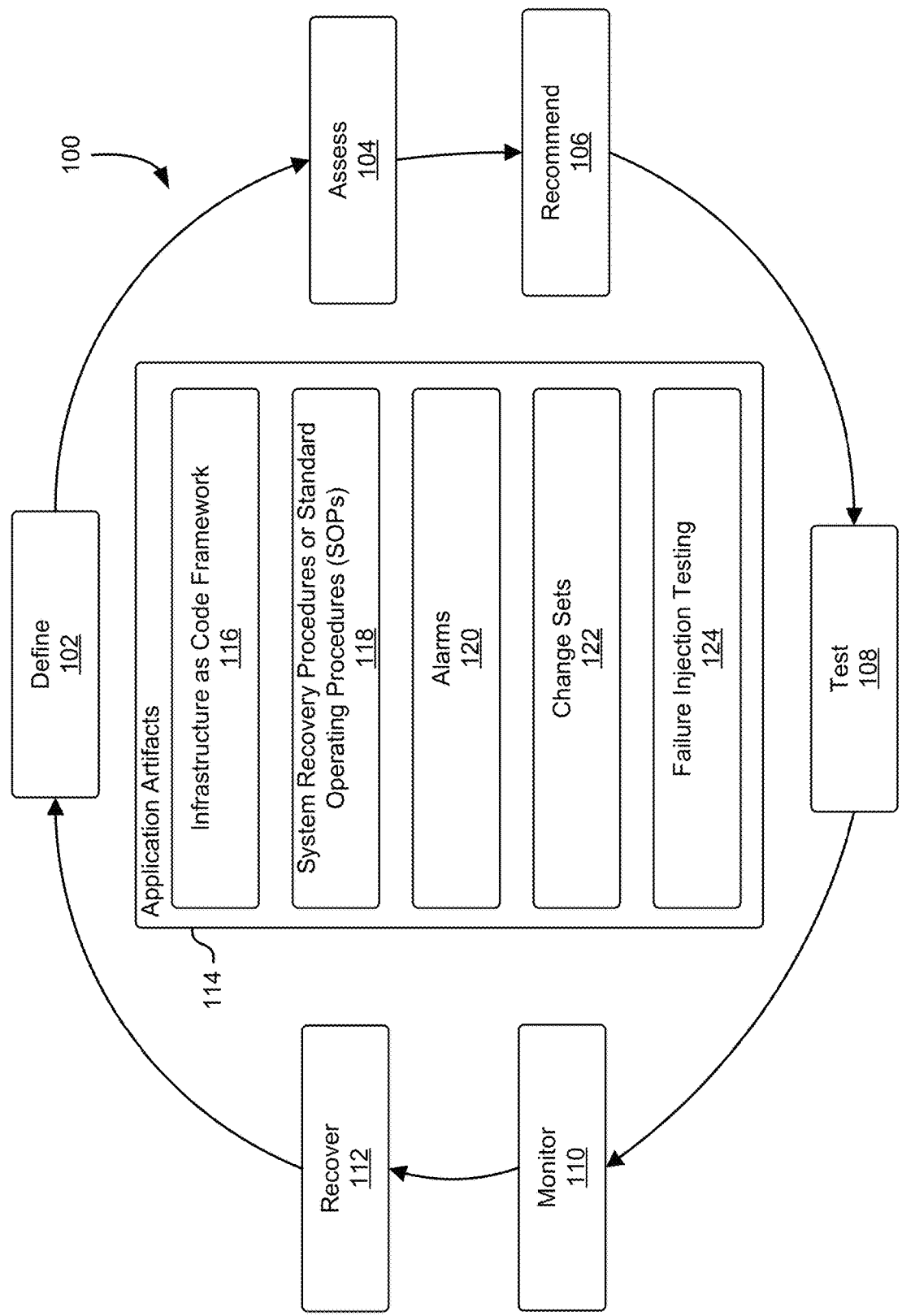
FIG. 1 illustrates an example of a workflow that uses the systems described herein to improve the reliability of application infrastructure, in an embodiment.

The present document describes a system that improves the reliability and resiliency of application infrastructure for applications supported by infrastructure as code. In various examples, the system examines the infrastructure of an application in which the infrastructure is represented as code, identifies potential failure vectors, and tests the identified failure vectors to determine how the application and infrastructure responds. Based at least in part on the responses, the system generates a measure of infrastructure reliability, and may suggest various changes to improve the reliability of the infrastructure. In some examples, standard operating procedures define recovery techniques which may be suggested or modified by the system.

Various examples of the techniques described herein may be particularly applicable to systems in which application infrastructure is defined as a set of machine-readable definition files sometimes referred to as infrastructure as code ("IAC"). Infrastructure as code may include both declarative and imperative approaches. In the declarative technique, code describes the target configuration for the infrastructure of the application. In the imperative approach, code describes how infrastructure may be modified to meet the needs of the application. In general, any framework or tool that performs or changes or configures infrastructure using a programmatic method can be part of an infrastructure as code system. Examples of infrastructure as code frameworks include Microsoft Power Shell DSC or Amazon Web Services CloudFormation. Examples of tasks that can be performed using infrastructure as code include installing and configuring a database, installing a virtual network, installing and configuring a virtual machine, and configuring network policies. By performing these operations in code, management operations can be managed and delivered in the same way in which code is developed, rather than relying on a complex set of manual operational procedures and standards.

In one example, the system examines the IAC code associated with an application and identifies, from the code, potential failures in the infrastructure. For example, if the IAC code calls for the configuration of a database, database failures would be identified as potential failure points. In another example, if region-redundant databases are specified, failures of individual regional databases, or failure of network connectivity to those regions would be identified as potential failures.

Using the list of identified potential failures, various examples generate a set of tests that model, simulate, and test each of the potential failures. For example, if the system identifies that redundant databases are defined in the IAC code, the system will attempt to inject these failures into the system to note how the application responds and recovers from such failures. Various examples measure not only whether the application recovers from such failures but the consequences of such failures such as whether failures are properly recorded, whether any data loss occurs, and how long it takes for the application to fully recover. In some examples, the system tests not only whether the system adapts as such failures, but whether the application returns to its normal configuration when the failure subsides.

Various examples produce metrics from the results of the above testing. Such metrics may include a coverage measure based on the infrastructure code. In some examples, coverage may include a percentage of potential failures that are tested, a percentage of tested failures that are properly reported by the application, a percentage of tested failures that are properly recovered by the application, or a percentage of failures that are recoverable using standard operating procedures.

At least one example described herein suggests standard operating procedures that can be automatically deployed in response to detected failures. Standard operating procedures can include scripts or programs designed to recover from or correct an infrastructure failure. Some embodiments include examples of standard operating procedures that are recommended to recover from identified failures. At least one embodiment assists in the management and suggests standard operating procedures to the customer, and the customer modifies the standard operating procedures in accordance with business requirements. In this way a library of standard operating procedures can be produced and managed by the system. Standard operating procedures may be tested as part of the reliability assessment, and coverage testing the standard operating procedures may be reported in some examples.

Various embodiments implement recommendation engines that produce recommended modifications and improvements to the application infrastructure. In some examples, the improvements are ranked and evaluated by determining a reliability measure for the existing infrastructure, determining a reliability measure for the proposed modified infrastructure, and using the difference as a score for the proposed modification. Proposed modifications can be presented to the user in an ordered list, with the most effective modifications ranked higher. Examples of modifications may include database redundancy, redundant network routing, the addition of redundant regional servers, the addition of standard operating procedures to recover from common failures, changes to security settings and policies, and changes to data storage strategies to create redundancy or more frequent backups.

Various applications allow the user to select from proposed modifications, and then apply the selected modifications to the infrastructure code automatically. In some examples, the modified infrastructure is tested, evaluated, and measured changes to the reliability and resilience of the infrastructure can be reported to the customer.

As one skilled in the art will appreciate in light of this disclosure, certain embodiments may be capable of achieving certain advantages, including some or all of the following. 1) Various examples provide an infrastructure as code approach to application availability. Various examples look at the infrastructure as code setup of applications to learn about the applications setup, and make recommendations that are rendered as IAC which can be redeployed along with the original application's IAC code. 2) Various examples provide a DR readiness score based on the application's Business Continuity and Disaster Recovery ("BCDR") policy and customer's configuration of application infrastructure. The DR score may, in various examples, depend on how often tests are run, the test coverage for different outage types, and how often recovery procedures are validated. 3) Various examples provide a Recovery Point Objective ("RPO")/Recovery Time Objective ("RTO") as a metric of application reliability. The system may publish estimated RTO/RPO of an application against a customer's defined BCDR policy for different outage types such as Software/Hardware/Availability Zone ("AZ")/Region based at least in part on application configuration. Various embodiments provide tools to run tests to measure actual RTO/RPO regularly for the app for each of these outage types. 4) Various examples provide BCDR Policy validations customers can act upon. At least one example validates the BCDR policy configured by customers for their application. The BCDR policy may contain the RTO/RPO for different outage types, and identify the allowed regions for application multi region setup against which the application may be assessed for compliance. 5) Various examples provide a multidimensional recommendation engine to help select a correct recommendation based on appropriate dimensions such as cost, location, need availability characteristics. Various examples provide recommendations for configuration changes, monitors, SOPs and tests based on the outage types configured in BCDR policy by customers. These recommendations can be optimized by cost, location, or availability characteristics such as lowest RTO/RPO.

FIG. 1 illustrates an example of a workflow that uses the systems described herein to improve the reliability of application infrastructure, in an embodiment. In various examples, the system in the case of a deployment error or fault in code development, the service still remains operational in each region. When the system recommends changes to application infrastructure, such tests are generally offered in a declarative way such that customers are able to redeploy their application infrastructure with monitoring and testing facilities. Various embodiments do not impose a barrier to automation that application developers want to do with their application or pipelines or both. Various examples do not enforce configurations or alarms on application infrastructure directly, but make recommendations to customers to implement such alarms or changes to application infrastructure.

The reliability system workflow 100 can be implemented with one or more computer systems having one or more processors that execute executable instructions stored in computer readable memory. Execution of the executable instructions causes the one or more computer systems to implement various features and workflows described herein. Some implementations are implemented using one or more services provided by an online service provider.

In at least one example, at block 102, BCDR objectives are defined for the application, in addition, in various examples, both the director of BCDR and the application owner validate that the application infrastructure conforms to regulatory requirements. In many situations, the application owner defines the application budget, and is responsible to ensure that the application meets its recovery objectives. At block 104, the system is used to assess the reliability of the application infrastructure. Assessment of the application infrastructure can be achieved in a variety of ways such as evaluation of infrastructure as code, comparison to best practices programmed into the system, and other techniques described above and below. At block 106, the system generates a set of recommendations that are presented to the user. Recommendations can include changes to standard operating procedures, recommended alarms to be implemented that monitor the state of the infrastructure, and changes to the infrastructure in the form of declarative changes to infrastructure code. Various changes can be adopted or rejected by the application infrastructure owner.

In at least one example, at block 108, the system performs a series of tests to evaluate the updated infrastructure. Testing may include simulating failures that are projected to be repairable by the application of standard operating procedures with automated scripts, ensuring that alarms properly signal various types of infrastructure failure, and testing redundant or fault-tolerant aspects of the infrastructure to ensure that they function correctly.

Various examples implement monitoring features 110 that allow the application owner to view the state of application infrastructure. For example, monitoring components of the system present the state of any alarms implemented, the version and change history of infrastructure code, and any recommended changes to the infrastructure.

Various recovery features 112 allow the system to respond and recover from infrastructure failures. In some examples, the system detects a failure to the application infrastructure, identifies a standard operating procedure associated with the detected failure, and then executes the SOP to recover from the failure. In some implementations, the system identifies a plurality of standard operating procedures. One or more standard operating procedures is to be executed based on the likelihood of recovery, a ranking for each standard operating procedure, or a selection made by the human operator. In one example, the system executes standard operating procedures in accordance with an ordering, and stops executing standard operating procedures when one of the standard operating procedures is successful in repairing the problem.

Together the workflow illustrated in FIG. 1 provides the following features: assessment of application resiliency to Software/AZ/Region outages within customer's BCDR policy; providing a list of recommendations to mitigate potential weaknesses found during assessment; allowing users to validate their disaster recovery plans regularly and measure actual RTO/RPO for their application; allowing users to inject failures to specific resources in their application to test resilience of application components; monitoring of the app health and policy compliance through customer defined health checks; and management of the recovery process and SOPs in case of outage through SSM and other AWS tools.

The workflow illustrated in FIG. 1 utilizes a set of application artifacts 114 to perform the steps in the workflow. The application artifacts include settings, configurations, and options that can be expressed as infrastructure as code 116. The infrastructure as code 116 can include security settings, redundancy settings, network configurations, virtual machine images, and initialization scripts.

The application artifacts 114 includes standard operating procedures 118. Standard operating procedures 118 can include scripts, programs, compiled or interpreted procedures, or executable instructions that perform recovery procedures for one or more potential faults of the application infrastructure. For example, a standard operating procedure may be a script that resets a database, resets a network policy, modifies infrastructure to allocate more disk space or network bandwidth, or resets a computer system or service running on a computer system.

The application artifacts 114 may also include a set of alarms 120. The alarms 120 include scripts, programs, or executable instructions that monitor various aspects of the infrastructure for proper operation. Various alarms may, for example, detect that a database, network connection, firewall, or support service is down or disconnected. Alarms may be created to detect security errors or intrusions, denial of service attacks, errors present in log files, or degradations in performance of the application.

The application artifacts 114 includes a set of change sets 122. In various examples, the change sets 122 are declarative changes to application infrastructure expressed as modifications to an existing set of application infrastructure as code. For example, the change sets 122 may include a set of redlined changes to existing IAC code used by the application. The change sets 122 may include additional IAC code files, initialization files, or scripts to be added to an existing set of IAC code.

The application artifacts 114 includes a set of failure injection tests that validate and measure the reliability of a set of application infrastructure. The failure injection tests 124 may include code that simulates failures to be detected by the alarms 120 or that trigger standard operating procedures 118. By executing the failure injection tests 124, the system is able to develop a measure of application infrastructure reliability, and also test for the proper operation of standard operating procedures 118 and alarms 120.

Figure 2:
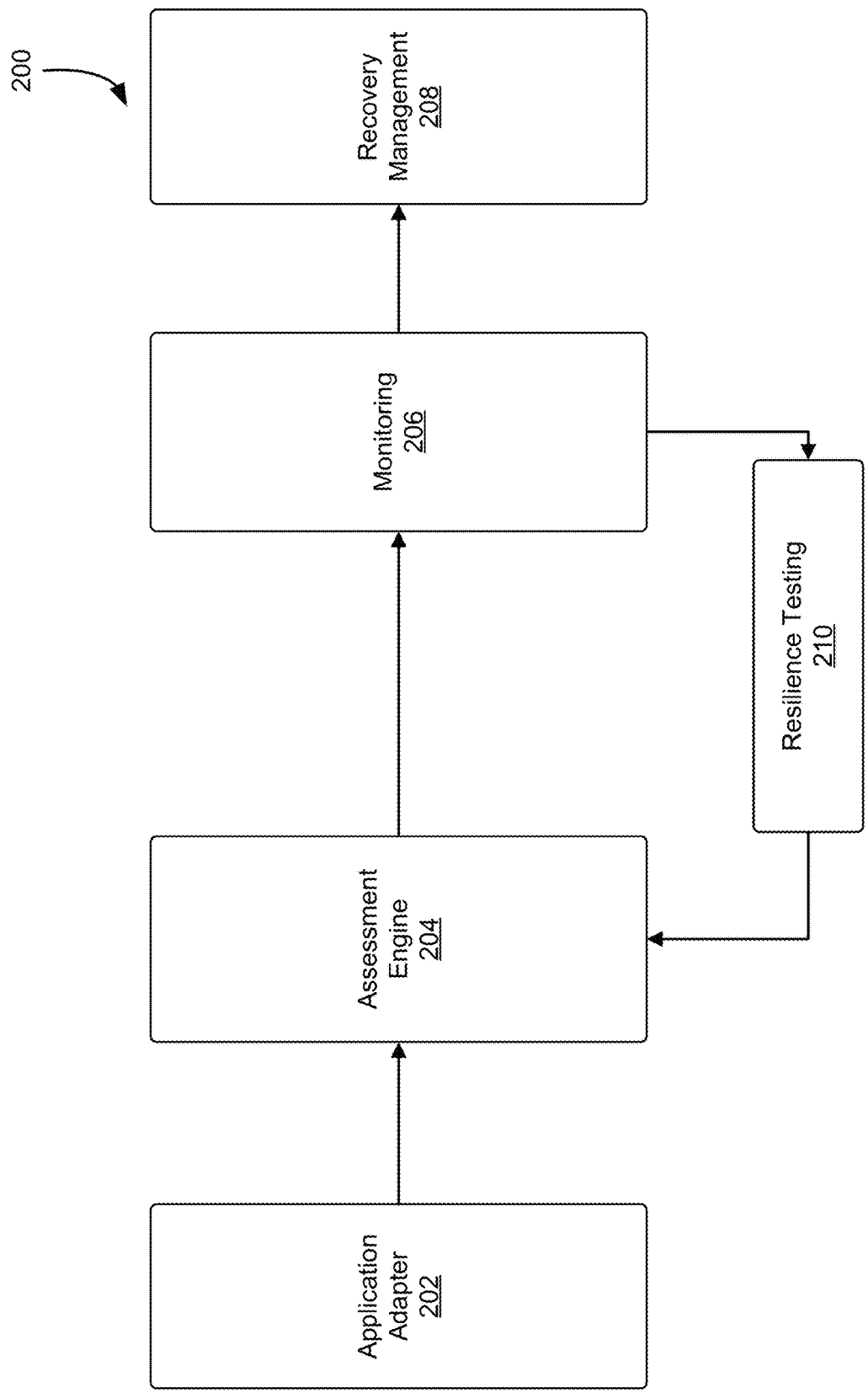
FIG. 2 illustrates an example of an architecture of a reliability service that improves the reliability of application infrastructure, in an embodiment.

FIG. 2 illustrates an example 200 of an architecture of a reliability service that improves the reliability of application infrastructure, in an embodiment. The architecture includes a number of software components implemented as executable code stored on computer-readable media. The executable instructions, as a result of being executed by one or more processors of a computer system, cause the computer system to perform various functions and operations described herein. In describing the system, portions or sections of the executable instructions may be referred to as a software component or module that performs a set of related functions. In one example, the reliability service includes an application adapter 202 that reads configuration files, initialization scripts, and settings that represent application infrastructure as infrastructure as code, and provides this code to an assessment engine 204. In one example, application metadata is used to adapt the customer's physical or logical resources into application components. The customer may have many resources in their computing resource services account which are not related to the application that they are building for Disaster Recovery. In some examples, the customer is guided through a process to onboard their resources to the reliability service.

The assessment engine 204 reads the code and identifies various points of potential failure described by the infrastructure. The assessment engine 204 runs an assessment on the customer's resources and determines whether it meets the customer's RTO/RPO requirements. In one example, the assessment is considered "In Policy" if the RTO/RPO are below the thresholds set by the customer. The reliability service may recommend changes to the customer's infrastructure configurations to allow it to be within policy. In some examples, the assessment engine 204 applies one or more rules and identifies shortcomings and weaknesses in the infrastructure. In various examples, the assessment engine 204 identifies dependencies of the infrastructure. For example, the assessment engine 204 may identify databases, network connections, storage devices, and network services upon which the application infrastructure depends. Using information provided by the assessment engine 204, a monitoring service 206 implements a variety of monitoring agents that monitor dependent services, databases, or services on which the infrastructure depends. The reliability service may suggest monitors which are required to be in place in order to ensure that the customer's application is healthy. The monitors which the customer accepts may be set up automatically by the reliability service.

For example, the monitoring service 206 may implement a database replication monitor, a network security monitor, a network status monitor, a data storage service monitor, and an API management service that indicates when a component on which the application infrastructure depends has a problem.

When the monitoring service 206 detects a problem, a monitoring service 206 may provide an indication to the application owner. In some examples, the monitoring service 206 provides alarms to a recovery management service 208. In some examples, based on the resources determined in the "Application Adapter" and the alarms configured in the "Monitoring", a reliability service will suggest SOPs that the customer may adopt. These SOPs are default fallback operations which the customer may benefit from given the infrastructure and basic knowledge of their application. When an alarm is tripped, the SOP is kicked off automatically to begin recovery of the customer's application.

The recovery management service 208 can provide recovery options to the application owner, and in some examples, automatically instigate recovery operations using standard operating procedures. In some examples, standard operating procedures include metadata identifying particular alarms, and characteristics of alarms, that are able to be resolved by performing the standard operating procedure. Some implementations may include a priority with the standard operating procedure such that when multiple standard operating procedures are applicable to a given alarm, certain standard operating procedures may be a preferred response.

For example, an alarm indicating a loss of database connectivity may be handled by a plurality of standard operating procedures where a first standard operating procedure checks network policies and firewall settings to ensure they allow connection to the database, a second standard operating procedure resets network policies and firewall settings, a third standard operating procedure resets the database service, and a fourth standard operating procedure restores the database from a backup. The standard operating procedures may include metadata that define a priority that performs the standard operating procedures in the above order. The ordering in which standard operating procedures are performed may be based on the level of potential service disruption, or data loss that may be incurred. In other examples, the ordering in which standard operating procedures are performed is based at least in part on the likelihood that a particular standard operating procedure is able to fix the associated alarm. Therefore, in some examples, the priority order of standard operating procedure may be dependent on the particular alarm raised. In some examples, the administrator may indicate to the system whether the system should prioritize operating procedures that are less disruptive, or prioritize standard operating procedures that are more likely to address a particular fault.

The system also includes a resilience testing module 210. Using the resilience testing module 210, the customer may test their fallback infrastructure and procedure by simulating a disaster. The disaster simulation can simulate a variety of failures which the customer may expect. The resilience testing module 210 executes tests to simulate possible failures of the application infrastructure. Possible failures may be identified by the assessment engine 204. Some examples implement tests that ensure proper operation of the monitoring service 206. For example, various tests may test that the monitoring service 206 properly identifies various failures of the application infrastructure. Using the results of the resilience tests, the system is able to provide a measure of application infrastructure resilience or reliability. In addition, some examples provide recommended changes to the application infrastructure, and the recommended changes can be evaluated by comparing the resilience score of the present application infrastructure to the resilience score of the proposed application infrastructure.

Various examples produce metrics which can help customers assess and quantify an application infrastructure's readiness to different outages scenarios. Metrics for software quality may include: Code coverage—is a measure of how much code is executed in response to a stimulus (e.g. running a test) and Test coverage—is a measure of how much of the feature set was executed as a result of a test. Various examples provide additional measures of software quality related to monitoring and recovery procedures needed to keep the application running during an unplanned outage. In one example, the system recommends a set of tests, monitors and standard operating procedures depending on the resources used in the app for various categories of outage.

Various examples produce reliability measures that indicate the robustness and resilience of application infrastructure. Reliability measures may include a readiness score ("RS") which reflects how close an application owner followed recommendations produced by the system. Recommendations may be produced in several areas including standard operating procedures, monitors, and tests. In one example, a readiness score is equal to one (best) if all recommended tests are run in a predefined period of time, the tests produced the correct alarms and triggered the standard operating procedures associated with those tests. For example, in various implementations, if the system recommends a test that produces one alarm that should be responded to by one operating procedure, the test is successful if the alarm is produced, the standard operating procedure is run, and the standard operating procedure correctly repairs the fault.

In at least one example, the system classifies the recommended tests, monitors and SOPs according to a priority (Critical, High, Medium and Low). Recommendations may also indicate the outage type to which they apply. Some recommendations may apply to multiple outage types. Implementing and regularly verifying higher priority recommendations contributes more to the readiness score. Some examples of the system compute the Test/Monitor/SOP coverage scores for each application component and outage category combination and then aggregates them based on weight of application component and outage category.

In one example, test coverage (T)—is a normalized score (0-1) based on number of tests and their priorities were run successfully out of a number of tests recommended by the system. $T_p$=Number of tests of priority p executed/Total number of tests of priority p recommended:

$$T = \mathrm{SUM}(T_p * \mathrm{Weight\ of\ } p)/\mathrm{SUM}(p)$$

In one example, monitors coverage (M)—is a normalized score (0-1) based on number of alarms and associated alarm priorities fired as a result of failure test runs out of total number of alarms defined on the app.

In one example, $M_p$=Number of monitors of priority p fired/Total number of monitors of priority p recommended:

$$M = \mathrm{SUM}(M_p * \mathrm{Weight\ of\ } p)/\mathrm{SUM}(p)$$

In one example, SOP coverage (S) is a normalized score (0-1) based on number of SOPs (manual or automated) and associated priorities triggered by test runs out of deployed number of SOPs.

In one example, $S_p$=Number of SOPs of priority p triggered/Total number of SOPs of priority p recommended:

$$S = \mathrm{SUM}(S_p * \mathrm{Weight\ of\ } p)/\mathrm{SUM}(p)$$

In one example, Readiness Score per app component per outage type, $RS_{ao}$=T*M*S. In one example, Readiness Score per app component per outage type, $RS_{ao}$=Weighted Average(T,M,S). In one example, Readiness Score per app component, $RS_a$=SUM($RS_{ao}$*Weight of corresponding outage type)/SUM(Weight of corresponding outage type). In one example, Readiness Score per outage type, $RS_o$=SUM($RS_{ao}$*Weight of corresponding app component)/SUM (Weight of corresponding app component). In one example, Readiness Score for App, RS=SUM($RS_o$*Weight of corresponding outage type)/SUM(Weight of corresponding outage type). In one example, Readiness Score for App, RS=SUM($RS_a$*Weight of corresponding app component)/SUM(Weight of corresponding app component)

Example Weight Based on Priority

| Priority | Weight |
| --- | --- |
| Critical | 50 |
| High | 30 |

-continued

| Priority | Weight |
|---|---|
| Medium | 15 |
| Low | 5 |

Example Weight for Tests/Monitors/SOPs

| Recommendation Type | Weight |
|---|---|
| Tests | 25 |
| Monitor | 25 |
| SOP | 50 |

Example Weight for Outage Type (We can customize based on customer's BCDR policy and RTO/RPO for different outage types)

| Outage Type | Weight |
|---|---|
| Region Outage | 10 |
| AZ Outage | 20 |
| Hardware Outage | 30 |
| Software Outage | 40 |

Example Weight for App Components (We can adjust weights here based on probability and severity of failures of different components, we could also take input from customers)

| App Component | Weight |
|---|---|
| Webservers | 25 |
| Database | 25 |
| Load Balancer | 25 |
| Application Server | 25 |

Various embodiments use the reliability measures described above and below to evaluate application infrastructure in the context of reliability policy as defined by the customer. In one example, a customer defines policies for different outage types and service levels required for the application. The reliability measures are compared against the criteria specified in these policies and the system reports in their compliance with or violation of the defined reliability policies. Policies may include parameters such as maximum downtime, maximum data loss in the event of a failure, minimum failure coverage, and minimum test coverage.

Figure 3:
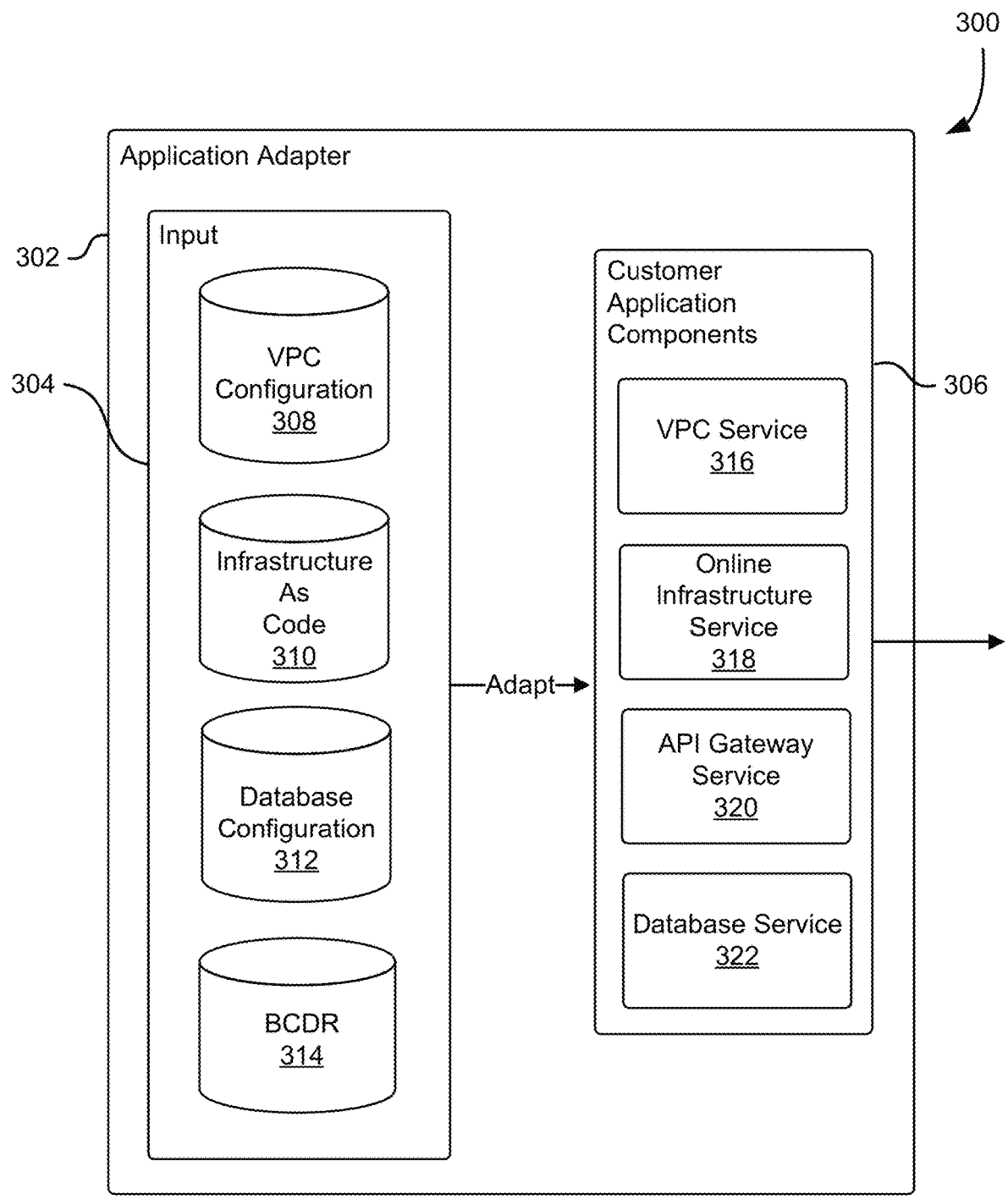
FIG. 3 illustrates an example of an application adapter of a reliability service, in an embodiment.

FIG. 3 illustrates an example 300 of an application adapter of a reliability service, in an embodiment. In one example, an application adapter 302 reads a set of inputs 304 which are provided to customer application components 306. The set of inputs may include for example the VPC configuration 308, infrastructure as code 310, database configuration information 312, and BCDR information specified by the customer 314. The reliability service uses this information to identify a set of customer application components 306. Examples of customer application components include a VPC service 316, an online infrastructure service 318, an API Gateway service 320, or database service 322.

In order for the reliability service to understand what the expected RTO/RPO of an application is and make suggestions, the reliability service has access to information that describes the customer's application. The application adapter 302 attempts to assist the customer with building a model of the application, so that the reliability service can assess the application's BCDR compliance.

In at least one example, the Application Adapter divides the application into "Application Components." Application components form the basis the reliability service uses to estimate RPO and RTO of the application, the suggested monitors to set up, the types of disasters that could impact the application, the type of failure tests the customer should consider and the recovery steps to consider in a disaster recovery SOP.

In various examples, the application adapter 302 breaks down the application into distinct application components. The application adapter 302 may store metadata that is used during assessment to understand how each component of an application is used. In some examples, application owners can use update operations to edit the application component details manually. Some implementations support an API that allows users to introduce many resources into an application template, and estimate which application component is represented by each resource.

Figure 4:
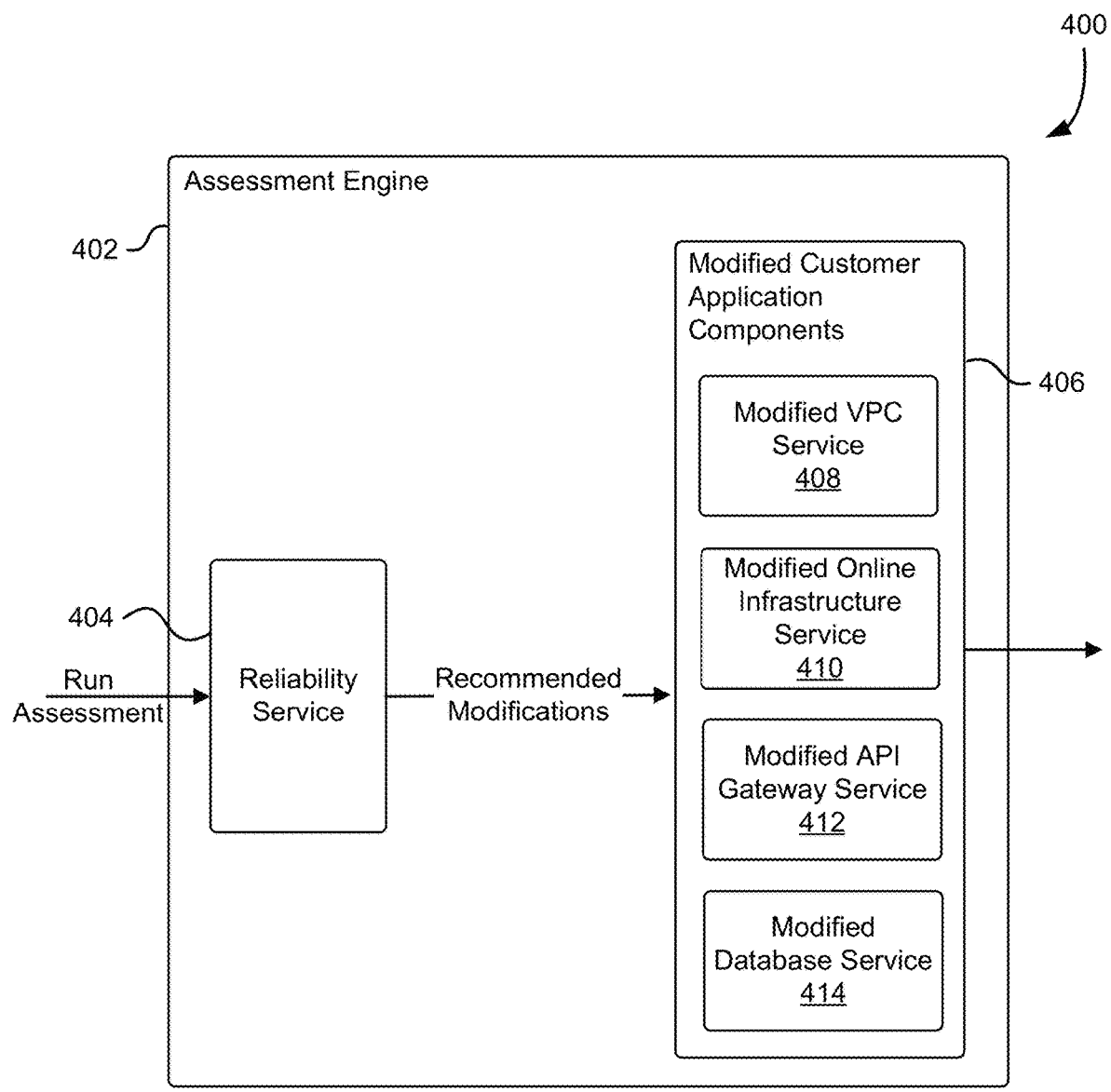
FIG. 4 illustrates an example of an assessment engine of a reliability service, in an embodiment.

FIG. 4 illustrates an example 400 of an assessment engine of a reliability service, in an embodiment. In at least one example, an assessment engine 402 includes a reliability service 404 that generates recommended modifications to application infrastructure to produce a set of modified customer application components 406, the set of modified customer application components may include for example a modified VPC service 408, the modified online infrastructure service 410, the modified API Gateway service 412, and modified database servers 414.

In various examples the assessment engine 402 is responsible for asynchronously assessing the customer's application for BCDR compliance. In various examples, if the application does not meet the BCDR policy in RTO/RPO, the process will provide configuration suggestions to conform to the policy. The assessment process may provide suggestions that save the customer money, suggestions to the recommended monitoring services, the type of failures that should be tested against and the SOPs that should be implemented to handle failures.

Failures monitored and repaired by the reliability service may include software and configuration failures, hardware failures, virtual machine instance failures, availability zone failures, and region failures. Software and configuration failures may be solved by having a customer replace code or data using a rollback roll forward or restore operation from backup. Hardware failures or instance failures may be solved by restarting or replacing the specific instance of a virtual machine. Availability zone failures may be solved by using resources in a different availability zone. Region failures can be solved by using resources of another region.

Figure 5:
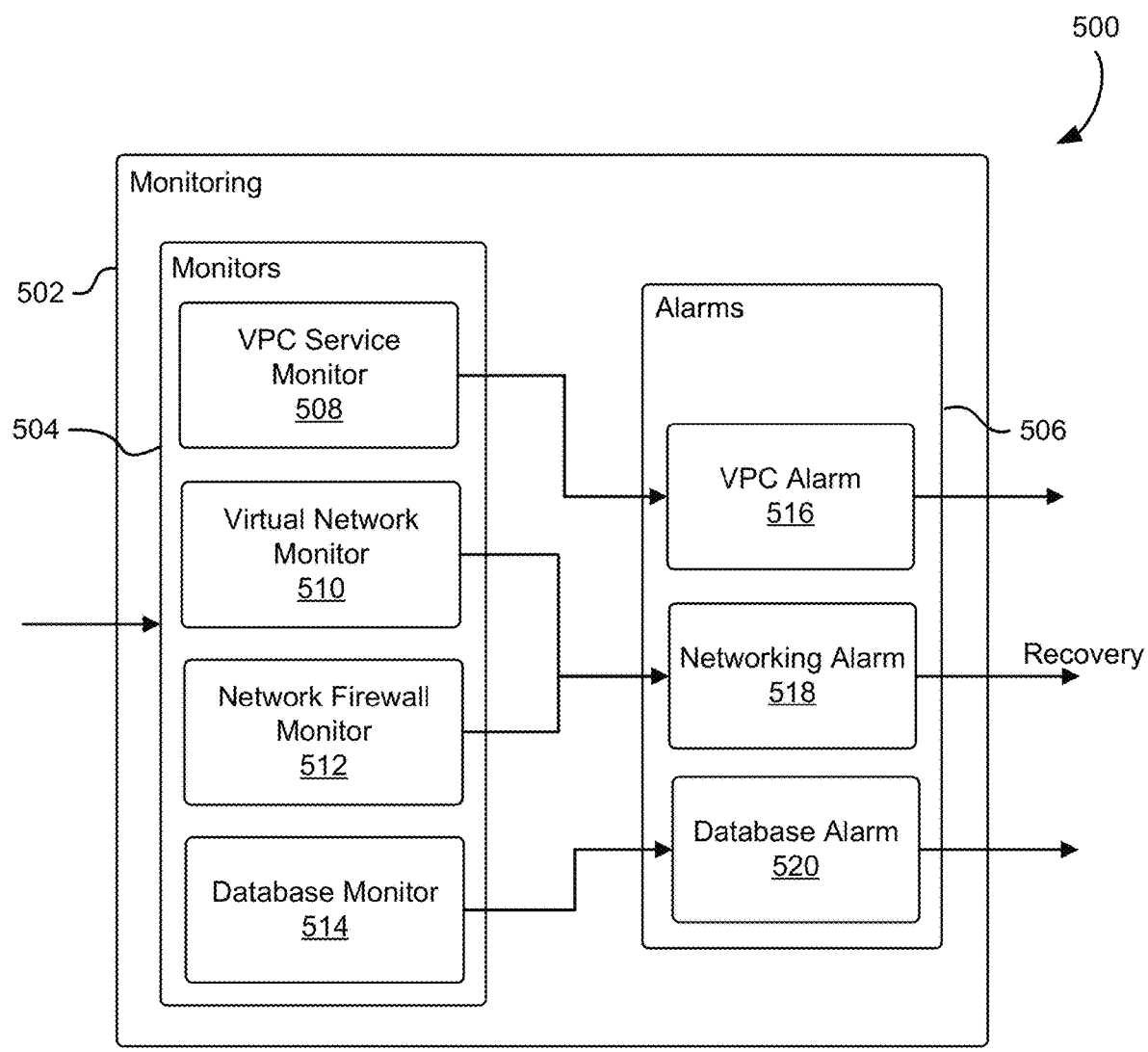
FIG. 5 illustrates an example of a monitoring module of a reliability service, in an embodiment.

FIG. 5 illustrates an example 500 of a monitoring component 502 of a reliability service, in an embodiment. Various examples of the monitoring component 502 include a set of monitors 504 the provide alarm information to alarm service 506. The set of monitors 504 may include one or more of a VPC service monitor 508, a virtual network monitor 510, a network firewall monitor 512, or database monitor 514. The set of monitors 504 provide alarm signals that are used by the alarm service 506 to produce a VPC alarm 516, a networking alarm 518, or database alarm 520. The alarm signals may be forwarded to a recovery service such as the recovery service illustrated in FIG. 6.

In order to provide a customer with the ability to track the health of their application, the reliability service provides a utility that creates alarms to alert the customer in the event of a failure. In order to protect the application from application component or infrastructure failures, the reliability service suggests metrics and monitors, and helps the customer implement a set of alarms. The reliability service may, in various examples, suggest redundant alarms in multiple regions to provide reliable alarm information to the customer. Some alarms may be based on conditions generated by a combination of other alarms. Alarms may include alarms such as In-Region Drift detection, where the reliability service alerts the customer of changes to resources that may reduce BCDR compliance (such as disabling of changing backups, adding or changing key components). Alarms may include In-Region DR monitors and alarms, and Cross-Region Synthetic monitors.

In one example, alarms are discovered using alarm tags. The reliability service can, in some examples, list the alarms that are to be tracked using the Tagging API. This allows the customer to define resources that should be taken into account during assessment as well as recommended alarms.

Figure 6:
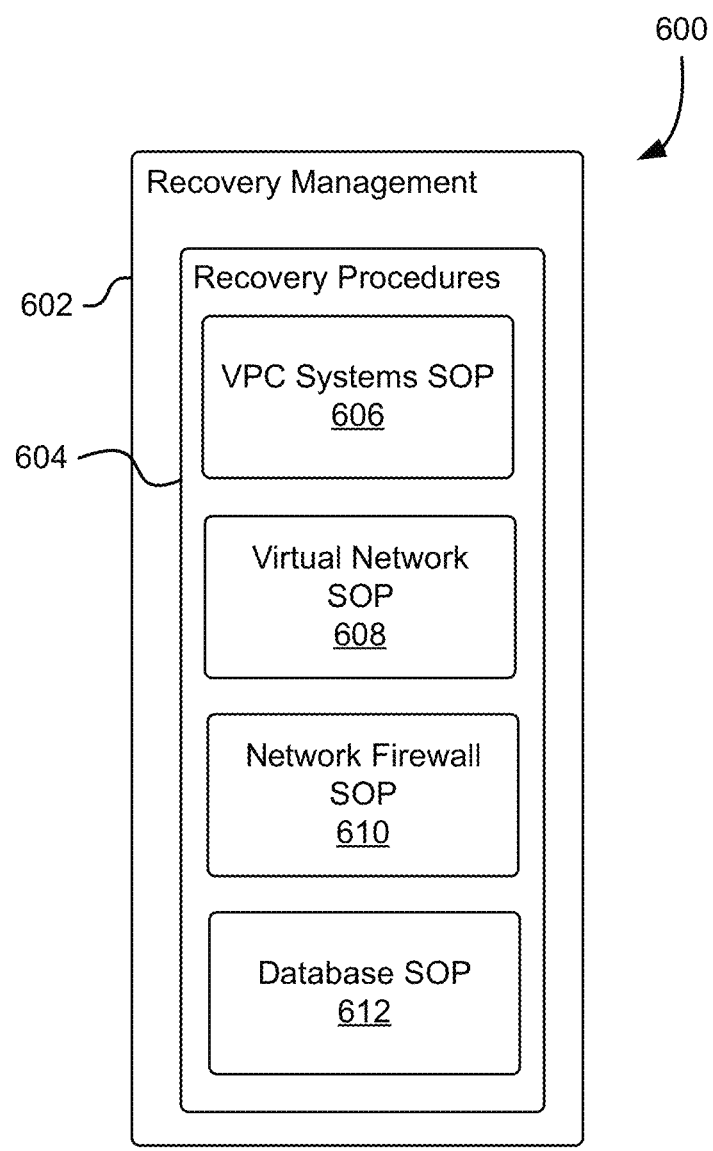
FIG. 6 illustrates an example of a recovery-management module of a reliability service, in an embodiment.

FIG. 6 illustrates an example 600 of a recovery-management module 602 of a reliability service, in an embodiment. The recovery management module 602 manages a set of recovery procedures 604 that can be used to recover from alerts generated by the monitoring component described above. In one example, the recovery procedures 604 include standard operating procedures for a VPC systems manager 606, virtual network manager 608, a network firewall manager 610, and a database manager 612.

In various examples, the recovery management module 602 provides customers with building blocks to write standard operating procedures as scripts that can be executed automatically or semi-automatically. The recovery management module 602, in some examples, suggests standard operating procedures for different scenarios based on the components identified in the application infrastructure. Standard operating procedures may be implemented to handle common disasters such as restoring an entire application to a new region, recovering data from a backup or safe-point, or application-specific failures of specific infrastructure components. The system provides customers with the ability to automate recovery by mapping standard operating procedures to a set of alarms. The reliability service recommends alarms to customers which in turn monitor the application to detect failures. Using these alarms, the reliability service can recommend standard operating procedures that will help automate recovery. In one example, the reliability service generates a mapping of alarms to standard operating procedures and automatically launches standard operating procedures in the event alarm is triggered.

Figure 7:
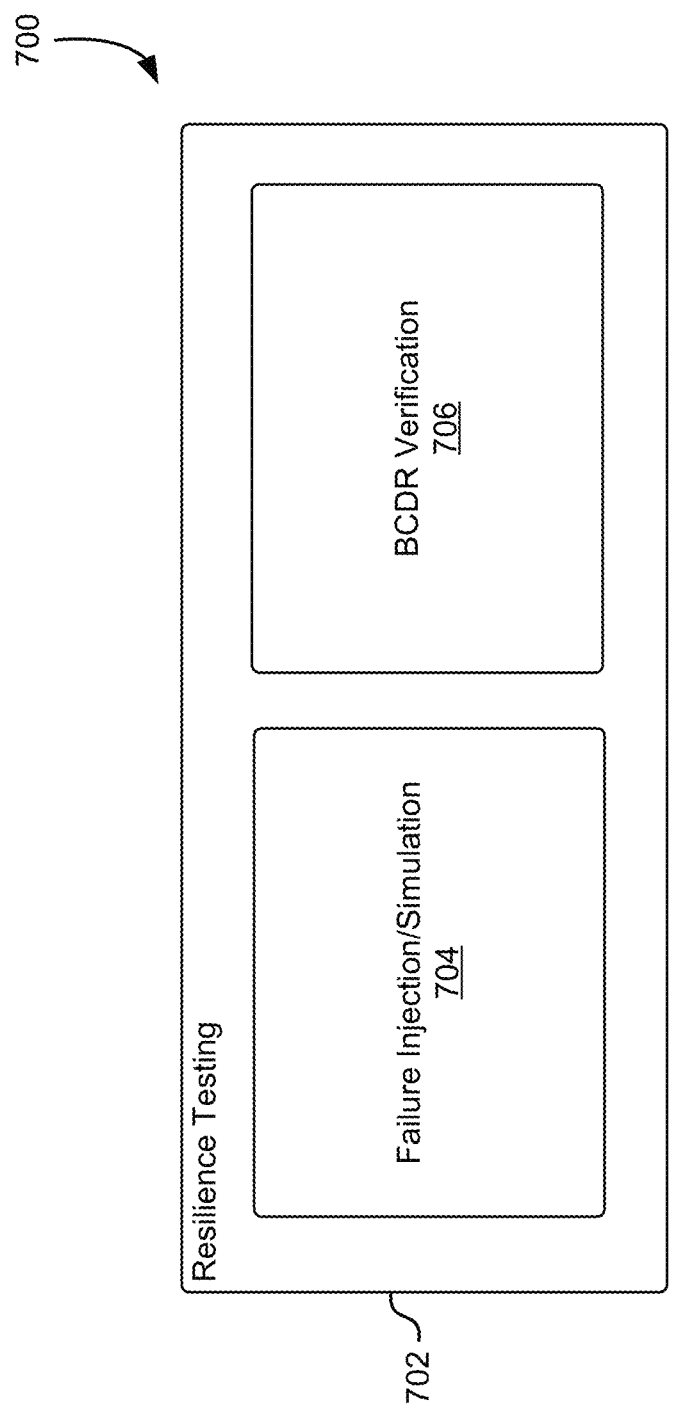
FIG. 7 illustrates an example of an resilience-testing module of a reliability service, in an embodiment.

FIG. 7 illustrates an example 700 of a resilience-testing module 702 of a reliability service, in an embodiment. The resilience-testing module 702 provides both failure injection/simulation 704, and BCDR verification 706. At least one example of the system provides mechanisms for testing resilience of customer's applications. This includes testing disaster recovery plans as well as support for injecting failures into the application to test resilience. Failure injection types include networking failures (network partition/latency/packet loss for example), host resource failures (CPU/memory/Disk Hog for example), state failures (terminating instances, processes, containers for example), capacity failures. Tests implemented by the resilience-testing module 702 may include a failure injection test, a disaster recovery plan test, or a test that triggers a recovery action. Tests may include rollback operations that reset the system after the test.

Figure 8:
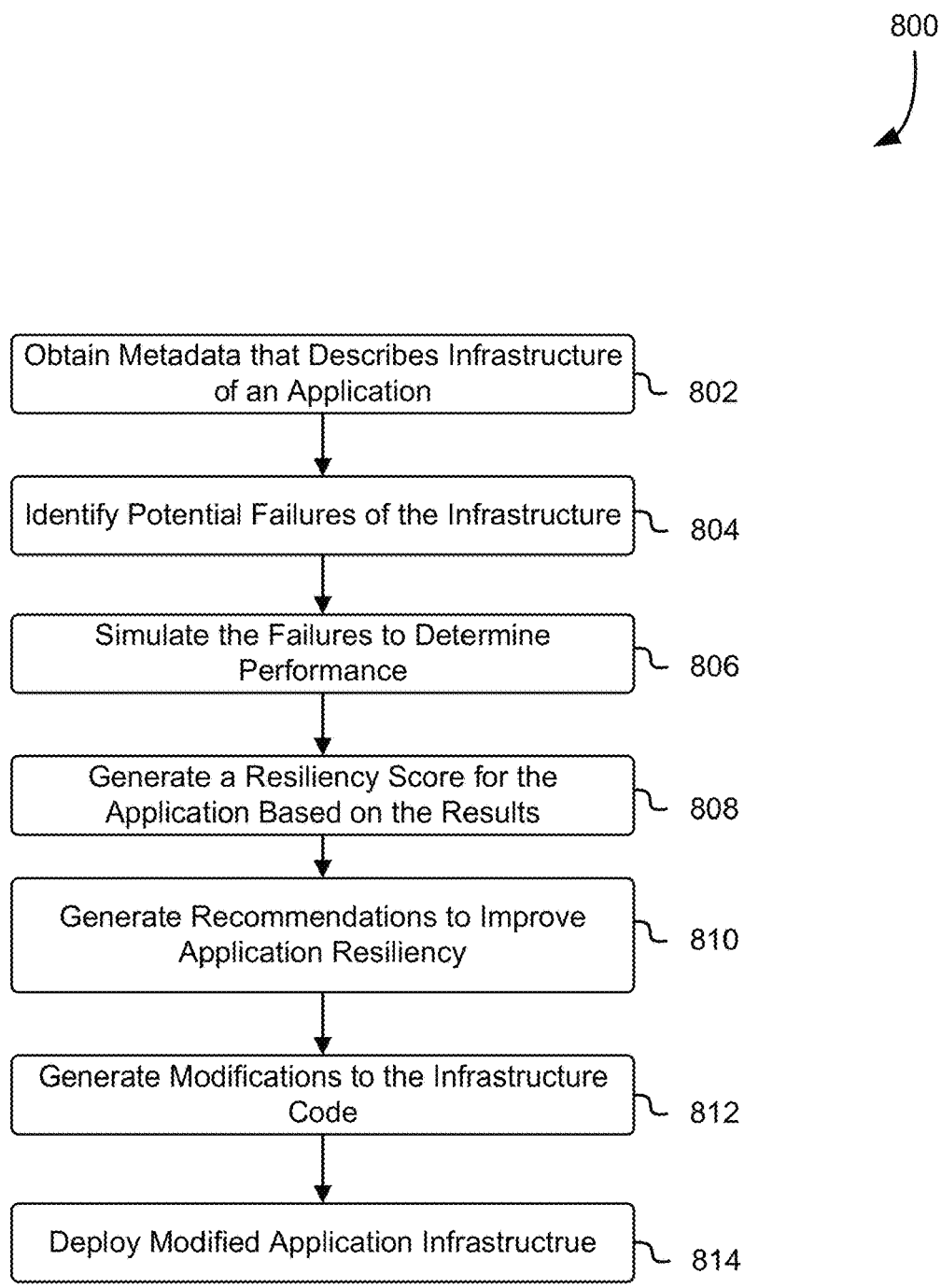
FIG. 8 Illustrates an example of process that, as a result of being performed by one or more processors of a computer system, implements a reliability service that improves the reliability of application infrastructure, in an embodiment.

FIG. 8 illustrates an example of process 800 that, as a result of being performed by one or more processors of a computer system, implements a reliability service that improves the reliability of application infrastructure, in an embodiment. The process 800 may, in various embodiments, be implemented using a computer system with one or more processors in communication with a computer-readable memory. The computer readable memory stores executable instructions that, as a result of being executed by one or more processors, perform the various steps described below. The computer system may be a physical computer system, a virtual computer system, or an online service providing computer processing services. The one or more processors may be a CPU, a GPU, a virtual processor, a multicore processor, or a processor network.

In at least one example, at block 802, the computer system obtains metadata describing infrastructure of an application. The metadata can be infrastructure as code, initialization files, scripts, virtual machine images, configuration files, or other data usable to generate an infrastructure for a computing application. At block 804, the computer system analyzes the metadata to identify potential failures for the infrastructure. In one example, the computer system identifies services, systems, and dependencies of the application from the metadata, and suggests configuration changes to improve the reliability of the infrastructure. For example, the computer system may identify that the application depends on a database, and suggests that redundant databases be created in multiple availability regions to increase the resiliency of the application infrastructure.

At block 806, various examples of the application simulate potential failures to determine the reliability of the infrastructure described by the metadata. For example, the system may simulate a network outage, a database failure, or security fault to determine if the application is able to detect the fault and if the application is able to recover from the fault. In another example, the system may simulate failure of a particular region or database replica to ensure that fault-tolerant infrastructure is working correctly. At block 808, the computer system generates a resiliency score based on the results of the tests performed above. The resiliency score provides a measure of reliability that can be provided to the application owner. In some examples, resiliency scores may be created for various proposed improvements as a way to quantify the amount of improvement to be gained by making a particular change.

At block 810, the computer system generates recommendations to improve the resiliency of application infrastructure. In one example, the computer system generates a variety of options to improve the reliability of infrastructure, generates a resiliency score for each option, and then proposes those options that provide the greatest improvement in the resiliency score. At block 812, the system generates changes to the existing application infrastructure in line with the selected improvement alternative. In some implementations, the human user selects alternatives from the proposed options. In other implementations, the system automatically implements changes to the infrastructure if the change produces an increase in resiliency score above a threshold amount. At block 814, the modified infrastructure is deployed, thereby improving the reliability and resiliency of the application. In the case where the infrastructure is deployed as infrastructure as code, the infrastructure code can be deployed resulting in the reconfiguration of the application infrastructure, thereby improving the reliability of the application.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Figure 9:
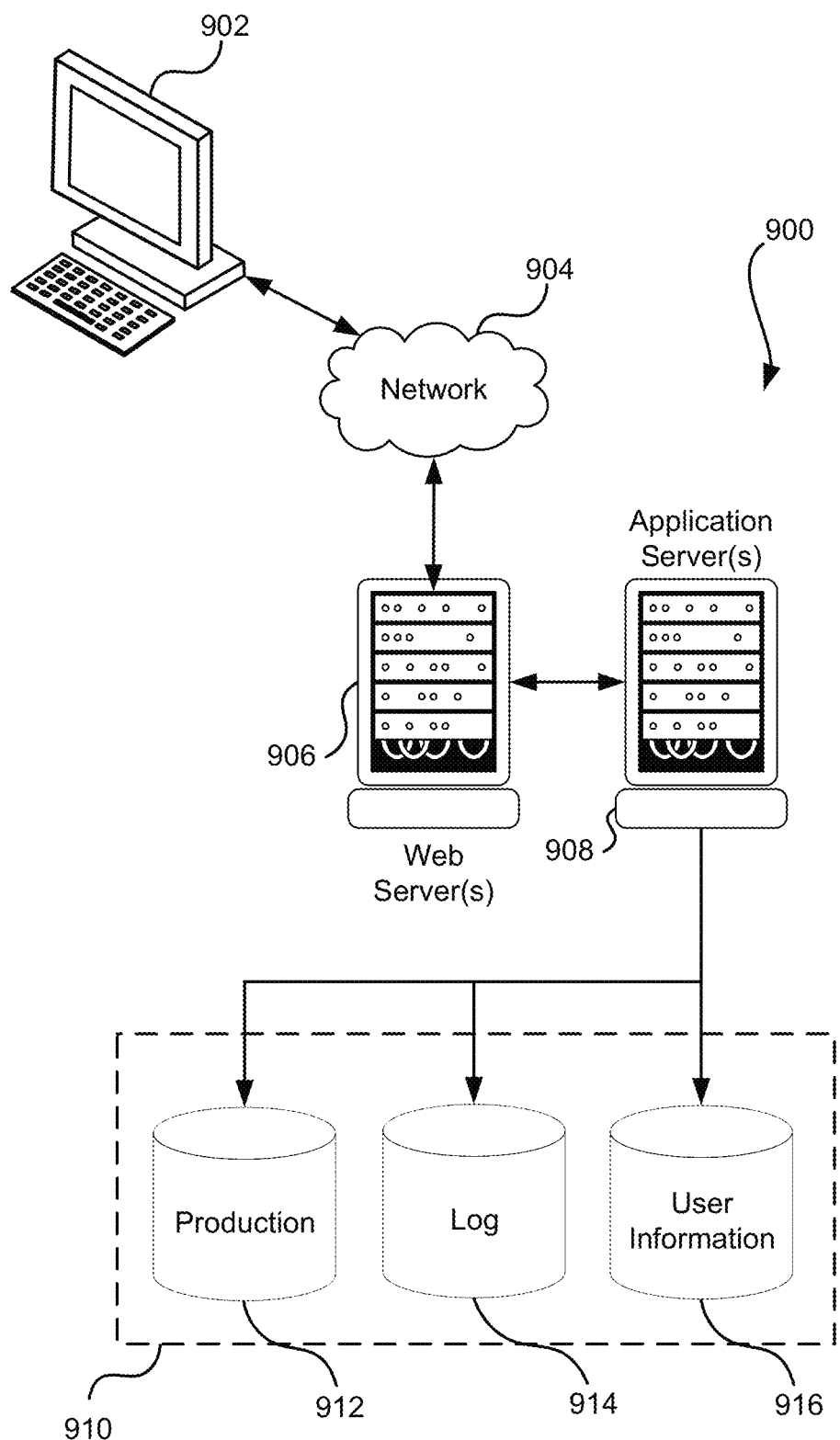
FIG. 9 illustrates a system in which various embodiments can be implemented.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, hand-held messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 906 for receiving requests and serving content in response thereto, although for other networks an alternative device serving a similar purpose could be used as would be apparent to one of ordinary skill in the art.

In an embodiment, the illustrative system includes at least one application server 908 and a data store 910, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 902 and the application server 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 910, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 912 and user information 916, which are used to serve content for the production side. The data store also is shown to include a mechanism for storing log data 914, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 910.

The data store 910, in an embodiment, is operable, through logic associated therewith, to receive instructions from the application server 908 and obtain, update or otherwise process data in response thereto, and the application server 908 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 902. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

Availability zones ("AZs") are isolated locations within data center regions from which network-based services originate and operate. Regions are geographic locations in which public network service providers' data centers reside.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
   obtaining metadata describing infrastructure of an application hosted by a computing resource service provider, the infrastructure including a set of computing resources with at least a first duplicated computing resource that allows the application to operate properly where one duplicate of the computing resource becomes unavailable, the metadata indicative of a configuration of the set of computing resources used by an instance of the application;
   generating a monitoring agent based at least in part on the metadata; describing the infrastructure, the monitoring agent comprising at least one of a database replication monitor, a network security monitor, a network status monitor, a data storage service monitor, and an API management service;
   identifying a change to the infrastructure that reduces the chance of the application failing due to a failure of the infrastructure based on a resiliency score generated from a simulation of the failure of the infrastructure;
   determining that the infrastructure complies with a reliability policy based at least in part on the resiliency score;
   updating the metadata in accordance with the change; and
   causing the infrastructure of the application to be updated in accordance with the change.

2. The computer-implemented method of claim 1, wherein the metadata describes a configuration of infrastructure as code.

3. The computer-implemented method of claim 1, wherein the set of computing resources is hosted by the computing resource service provider.

4. The computer-implemented method of claim 1, further comprising:
   presenting information that identifies a set of potential infrastructure changes;
   obtaining a selection of infrastructure changes of the set of infrastructure changes, the selection of infrastructure changes including the change to the infrastructure; and
   applying the selection of infrastructure changes to the infrastructure.

5. A system, comprising:
   one or more processors; and
   memory that stores computer-executable instructions that, as a result of being executed, cause the system to at least:
      obtain metadata describing infrastructure of an application hosted by a computing resource service provider, the infrastructure including a set of computing resources with at least a first computing resource that is duplicated so the application operates properly if one instance of the computing resource becomes unavailable, the metadata usable to configure the set of computing resources for an instance of the application;
      identify, using the metadata, a set of potential failures of the infrastructure;
      collect results produced as a result of generating individual failures from the set of potential failures;
      generate a reliability assessment of the infrastructure based at least in part on the metadata and the results;
      generate a value indicative of failure coverage based on the results;
      generate, based on the value, information regarding the infrastructure indicating whether the infrastructure complies with a reliability policy; and
      generate a monitoring agent based at least in part on the information regarding the infrastructure, the monitoring agent comprising at least one of a database replication monitor, a network security monitor, a network status monitor, a data storage service monitor, and an API management service.

6. The system of claim 5, wherein the computer-executable instructions, as a result of being executed, cause the one or more processors to further:
   determine whether the infrastructure complies with the reliability policy.

7. The system of claim 6, wherein the reliability policy specifies an allowable amount of data loss in event of a failure.

8. The system of claim 7, wherein the allowable amount of data loss is specified as a maximum threshold amount of time over which the application may lose data.

9. The system of claim 5, wherein the computer-executable instructions, as a result of being executed, cause the one or more processors to further evaluate the efficacy of a proposed change to the infrastructure based at least in part on difference between a first reliability assessment of the infrastructure without the proposed change and a second reliability assessment of the infrastructure with the proposed change.

10. The system of claim 9, wherein the computer-executable instructions, as a result of being executed, cause the one or more processors to further:
determine that the difference is greater than a threshold amount; and
implement the proposed change as a result of the difference being greater than the threshold amount.

11. The system of claim 5, wherein the computer-executable instructions, as a result of being executed, cause the one or more processors to obtain the metadata by examining the infrastructure of the application.

12. A non-transitory computer-readable storage medium storing thereon executable instructions that, as a result of being executed by one or more processors of a computer system, cause the computer system to at least:
obtain information describing, as code, infrastructure of an application, the code comprising information indicative of a configuration of a plurality of computing resources, the plurality of computing resources including at least a first computing resource that is duplicated in a plurality of availability zones such that the application operates properly if one instance of the resource in one of the plurality of availability zones is unavailable;
generate a monitoring agent based at least in part on the information, the monitoring agent comprising at least one of a database replication monitor, a network security monitor, a network status monitor, a data storage service monitor, and an API management service;
identify a potential failure of the infrastructure;
determine how the application responds to the potential failure;
generate a reliability measure for the application infrastructure based at least in part on a result of determining how the application responds to the potential failure;
generate a value indicative of failure coverage based on the results; and
determine, based on the value indicative of failure coverage, whether the infrastructure complies with a reliability policy.

13. The non-transitory computer-readable storage medium of claim 12, wherein the instructions further comprise instructions that, as a result of being executed by the one or more processors, cause the computer system to:
obtain a policy that describes at least one reliability threshold for the application;
compare the reliability measure to the reliability threshold; and
indicate whether the application meets the reliability threshold.

14. The non-transitory computer-readable storage medium of claim 13, wherein the policy identifies a maximum amount of time that the application is allowed to be unavailable.

15. The non-transitory computer-readable storage medium of claim 12, wherein a test verifies that execution of a standard operating procedure restores proper operation after the potential failure occurs.

16. The non-transitory computer-readable storage medium of claim 12, wherein a test verifies that an alarm is raised as a result of an occurrence of the potential failure.

17. The non-transitory computer-readable storage medium of claim 12, wherein:
the application includes a resource that is duplicated in a plurality of availability zones; and
a test verifies that the application operates properly if one instance of the resource in one of the plurality of availability zones is unavailable.

18. The non-transitory computer-readable storage medium of claim 12, wherein the potential failure is a failure of a database replica, a failure of a network connection, a failure of a resource in an availability zone, a failure of a storage device, or a failure of an online service.

19. The non-transitory computer-readable storage medium of claim 12, wherein the instructions further comprise instructions that, as a result of being executed by the one or more processors, cause the computer system to:
generate a plurality of proposed modifications to the infrastructure;
determine an economic cost of implementing each modification of the plurality of proposed modifications; and
recommend a particular modification based at least in part on the economic cost of the particular modification relative to an economic cost of other modifications of the plurality of proposed modifications.

* * * * *